United States Patent [19]

Hamabe et al.

[11] Patent Number: 4,809,093

[45] Date of Patent: Feb. 28, 1989

[54] APPARATUS FOR SELECTIVELY CONTROLLING MAGNETIC TAPE RECORDER'S MUTING OPERATION IN RESPONSE TO DETECTION OF ERRORS IN THE REPRODUCED SIGNAL BY ONE OF TWO HEADS

[75] Inventors: Makoto Hamabe, Maebashi; Yasuhiro Yamada, Yokosuka, both of Japan

[73] Assignee: Victor Company of Japan, Ltd., Japan

[21] Appl. No.: 70,041

[22] Filed: Jul. 6, 1987

[30] Foreign Application Priority Data

Jul. 10, 1986 [JP] Japan .................................. 61-160922

[51] Int. Cl.[4] .......................... G11B 5/09; G11B 20/18
[52] U.S. Cl. ........................................ 360/67; 360/64; 360/61
[58] Field of Search ....................... 360/67, 64, 61, 53, 360/32, 31, 25

[56] References Cited

FOREIGN PATENT DOCUMENTS

0064608  5/1980  Japan ..................................... 360/67
0105807  8/1980  Japan ..................................... 360/61

Primary Examiner—Raymond F. Cardillo
Assistant Examiner—Kevin Fournier
Attorney, Agent, or Firm—Andrus, Sceales, Starke & Sawall

[57] ABSTRACT

The present muting control apparatus comprises a first circuit for indicating selection of the error signal relative to N−m (N and m are natural numbers satisfying N>m) data blocks of N data blocks reproduced by a first rotary head when all of the first m data blocks thereof have errors. The first circuit also indicates selection of the error signal relative to N−m data blocks of N data blocks reproduced by a second rotary head when at least one of the first m data blocks reproduced by the first rotary head has no error. The muting control circuit also comprises a second circuit for generating a muting control signal indicating whether to mute the reproduced audio signal, by using error signal which is indicated by the first circuit.

7 Claims, 6 Drawing Sheets

APPARATUS FOR SELECTIVELY CONTROLLING MAGNETIC TAPE RECORDER'S MUTING OPERATION IN RESPONSE TO DETECTION OF ERRORS IN THE REPRODUCED SIGNAL BY ONE OF TWO HEADS

BACKGROUND OF THE INVENTION

The present invention relates to a muting control apparatus, and in particular to a muting control apparatus which produces indication for a muting control in accordance with an error signal which indicates whether each data block of a digital audio signal has errors.

As known, a rotary head type digital audio tape recorder (hereinafter simply referred to as R-DAT) has been developed, in which an analog audio signal is digitized and a digital audio signal thus obtained is recorded on and reproduced from a magnetic tape by means of rotary heads, which are mounted on a head drum.

Such an R-DAT encodes, at one time, the predetermined number of samples obtained by sampling an analog audio signal to form a digital audio signal, and then records this digital audio signal every 128 data blocks on one track of a magnetic tape by means of two rotary heads which scan the magnetic tape alternately. As another recording method, a recording method using interleaving is employed. In the recording using interleaving, odd samples located at the odd sampling numbers and even samples at the even sampling numbers are mutually separated. Then, the digital audio signal relative to the odd samples is recorded on odd tracks by the first rotary head and the digital audio signal relative to the even samples are recorded on even tracks by the second rotary head.

Figure 1:
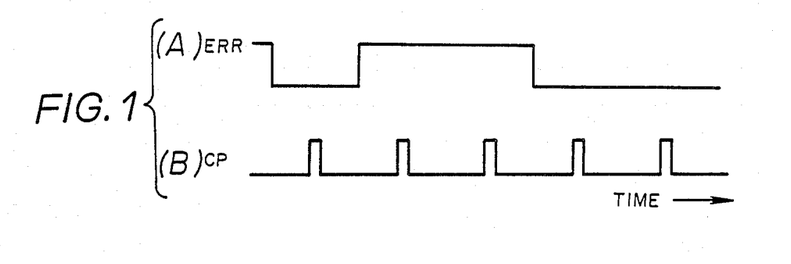
FIG. 1 shows waveforms of signals used in a rotary head type of a digital audio tape recorder.

Further, the R-DAT carries out an error check for each data block of the digital audio signal read out from the magnetic tape by the first and second heads. In this operation, an error signal of a high (H) level is generated for each data block having errors and the error signal of a low (L) level is generated for each data block having no error, as shown in FIG. 1 (A). In addition, one pulse called a count pulse CP is generated for each data block, as shown in FIG. 1 (B). Those signals are produced by a signal process circuit in the R-DAT.

In the reproducing operation, the data block having errors introduces noise on an analog audio signal converted from the reproduced digital audio signal. In this case, such noise on the analog audio signal is temporary when part of data blocks of the digital audio signal has errors. This means that voice or sound corresponding to this analog audio signal does not have remarkable problems in view of the sense of hearing. However, when there exist many data blocks having errors, remarkable problems in view of sense of hearing are brought about. In order to avoid these problems, the R-DAT uses a muting control for muting the audio signal having noise. In a conventional muting control apparatus, an error rate of the reproduced digital audio signal is measured for the muting control. The error rate is a ratio of the number of data blocks having errors out of given data blocks with respect to that of all the given data blocks. The error rate used for the muting control is obtained by calculating the error rate of the digital signal reproduced by the first rotary head as well as the error rate of the digital signal reproduced by the second rotary head, and then by calculating the mean value of those error rates. Then, the muting process is initiated when the mean value exceeds a predetermined value.

By the way, when blinding due to dust or the like deposited on gaps of the rotary head is occurred, this rotary head no longer reads out the digital audio signal recorded on the magnetic tape.

For example, assume that muting for the reproduced audio signals carried out when the error rate of the reproduced digital audio signal exceeds 50%. It is further assumed that the first rotary head operates generally normally with 10% of the error rate, and the second rotary head cannot reproduce the digital signal with 100% of the error rate. In this case, the error rate of the reproduced digital audio signal is equal to 55% in total, and therefore the muting control is carried out.

In the above example, consider such a situation that the digital audio signal is recorded on tracks in accordance with the recording method using interleaving. That is, the digital signal relative to odd samples is recorded on odd tracks and the digital signal relative to the even samples is recorded on even tracks. In this case, it is possible to reproduce odd samples, because the first rotary head operates normally as mentioned above. On the other hand, it is impossible to reproduce even samples, because blinding is occurred on the second rotary head. However, it is possible to obtain even samples substantially equivalent to the original even samples by interpolating the odd samples. This means that in the recording method using interleaving, the muting control is not necessary, so long as the first rotary head operates normally. However, in the above example, the conventional muting control apparatus produces indications for muting the reproduced audio signal. This is because the conventional muting control apparatus uses the mean value of two error rates with regard to two heads as the error rate for the muting control, as described before.

SUMMARY OF THE INVENTION

Accordingly, it is a general object of the present invention is to provide a novel and useful muting control apparatus in which the problems described heretofore are eliminated.

Another and specific object of the invention is to provide a muting control apparatus in which a muting control signal indicating whether to mute the audio signal is generated on the basis of an error signal relative to only a rotary head having no blinding occurred on gaps thereof, when blinding is occurred on gaps of the other rotary head. The detection of occurrence of blinding in a rotary head is accomplished by monitoring the error signal with respect to the first m (m is a natural number) data blocks of N (N is also natural number satisfying N>m) data blocks of the reproduced digital audio signal. When at least one data block reproduced by the first rotary head has no errors, the error signal relative to N−m data blocks by the first rotary head is selected for the muting control. Alternatively, when all of the first m data blocks reproduced by the first rotary head have errors, the error signal relative to N−m data blocks by the second rotary head is selected for the muting control. This means that the present muting control apparatus does not use the error signal relative to the first rotary head in which blinding is occurred.

DETAILED DESCRIPTION

Figure 2:
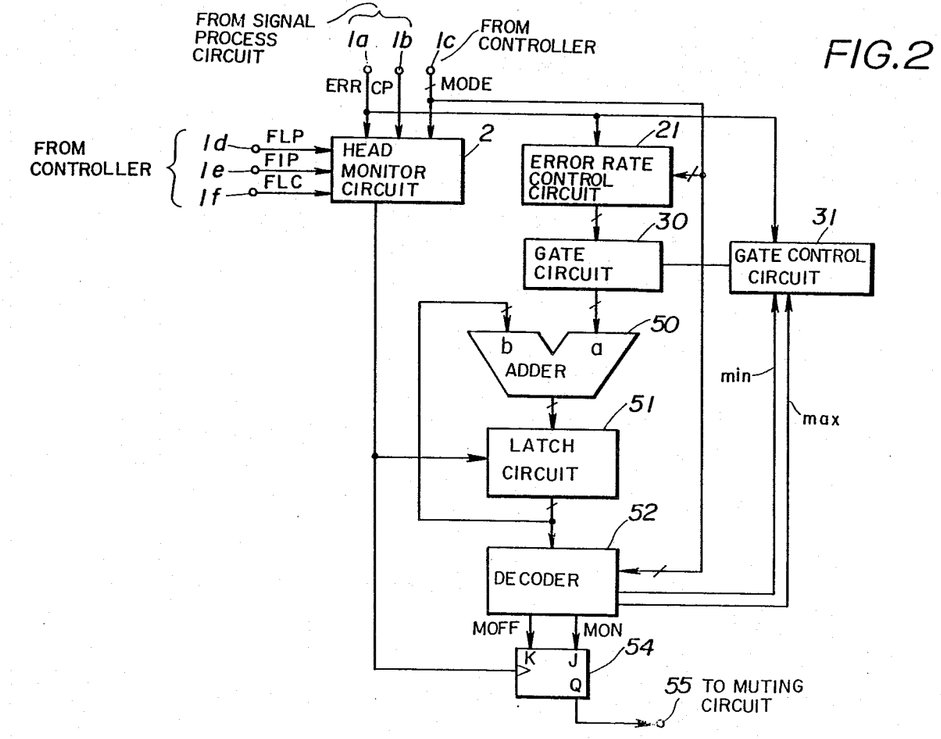
FIG. 2 is a block diagram illustrating one embodiment according to the present invention.

Referring to FIG. 2, an error signal ERR shown in FIG. 1(A) is applied to a terminal 1a, and count pulses CP shown in FIG. 1(B) are applied to a terminal 1b. A mode signal MODE composed of a plurality of bits is applied to a terminal 1c. Those signals are supplied to a head monitor circuit 2. The mode signal MODE, which is sent from a controller (not shown) in the R-DAT, is a signal which indicates whether the recording method using interleaving is adopted and also indicates an error rate to be set for an up-down counter which will be described hereafter.

Figure 3:
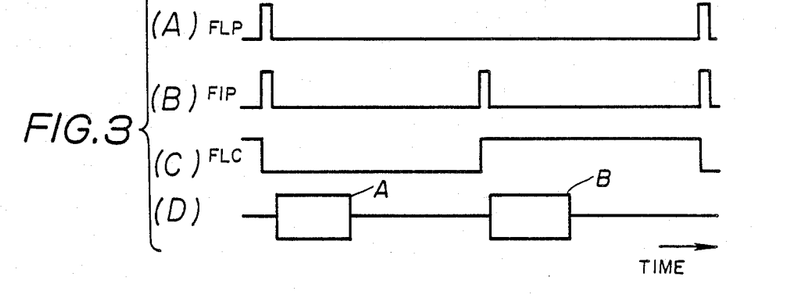
FIG. 3 shows waveforms of signals inputted to the apparatus of FIG. 2.

Furthermore, a frame pulse FLP shown in FIG. 3 (A) is applied to a terminal 1d, and a field pulse FIP shown in FIG. 3 (B) is applied to a terminal 1e, and a frame clock FLC shown in FIG. 3 (C) is applied to a terminal 1f. Those signals are fed from the controller to the head monitor circuit 2. The frame pulse FLP is a signal which indicates the start of the reproducing operation of a first rotary head (not shown) and is produced every one rotation of a head drum (not shown) on which the first and second rotary heads are mounted. The field pulse FIP is a signal which indicates the start of the reproducing operation of each of the first and second rotary heads. The frame clock FLC is a signal for switching the first and second rotary heads. The reproduced digital audio signal derived from the first rotary head with respect to the signals FLP, FIP and FLC is indicated by a block of symbol A in FIG. 3 (D). Similarly, the reproduced digital audio signal derived from the second rotary head is indicated by a block of symbol B. In each of the blocks A and B, 128 count pulses CP shown in FIG. 1(B) are generated.

Figure 4:
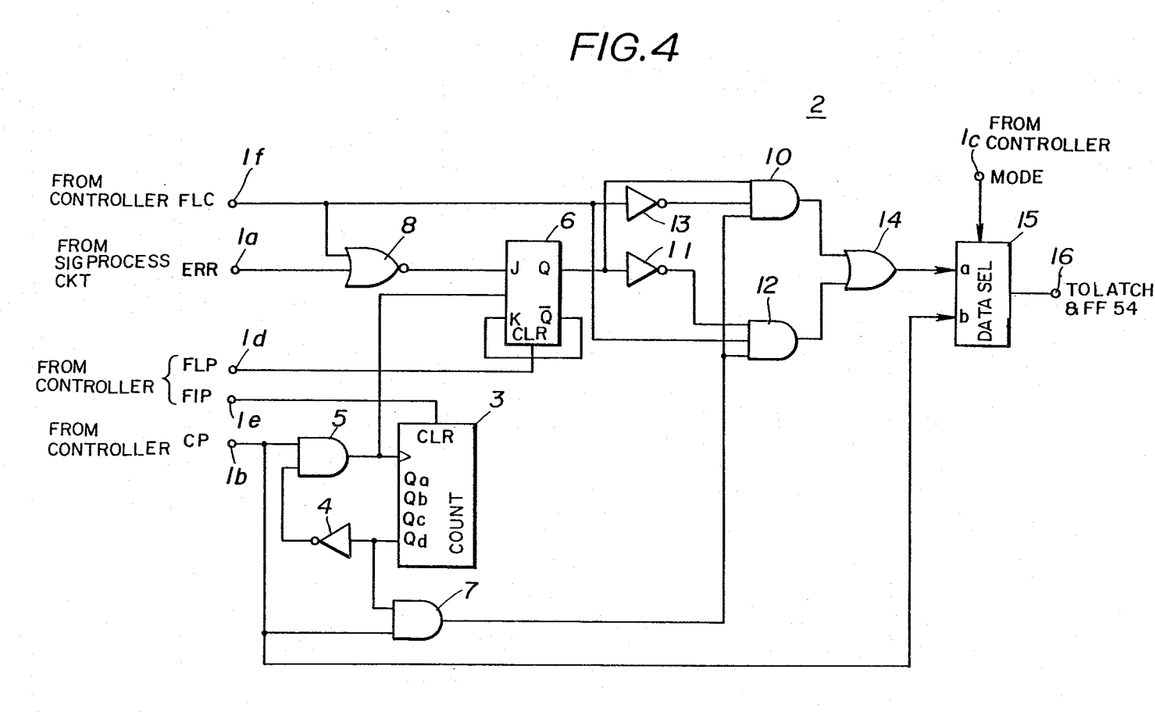
FIG. 4 is a circuit diagram illustrating a head monitor circuit shown in FIG. 2.

The head monitor circuit 2 acts to output the indication for selecting one of the error signal ERR associated with the first rotary head and the error signal ERR associated with the second rotary head, by monitoring whether blinding is occurred in the first or second rotary head. Referring to FIG. 4, which is a circuit diagram of the head monitor circuit 2, a counter 3 counts the count pulses CP with 4-bits and outputs it through terminals Qa, Qb, Qc and Qd. The count value is all zero-cleared when the field pulse FIP is applied to a clear terminal CLR. The fourth bit (MSB) of the count value, which appears at the terminal Qd, is inverted by an inverter 4, the output of which is applied to an AND circuit 5. The AND circuit 5 passes 8 count pulses CP after application of the field pulse FIP thereto, and feeds them to a clock input terminal of the counter 3 as well as a clock input terminal of a JK type flip-flop 6. An AND circuit 7 passes 120 count pulses CP following said 8 pulses.

A NOR circuit 8, an input terminal of which is supplied with the frame clock FLC, inverts the error signal ERR during the frame clock FLC being at the L-level and delivers an inverted error signal to the J-input terminal 8 of the flip-flop 6. The Q-output terminal of the flip-flop 6 is connected to the K-input terminal thereof. Thus, the flip-flop 6 latches the level of the J-input terminal in response to the count pulses passing the AND circuit 5, after the frame pulse FLP is applied to the clear terminal CLR of the flip-flop 6. Accordingly, the level at the Q-terminal of the flip-flop 6 is high when there is at least one data block having no error in the first 8 data blocks of the digital audio signal reproduced by the first rotary head. On the contrary, the level at the Q-terminal of the flip-flop 6 is low when all of the first 8 data blocks of the digital audio signal reproduced by the first rotary head have errors. As to the operation of the flip-flop 6, since the output level of the NOR circuit 8 is kept low irrespective of (the level of) the error signal while the frame clock FLC is at the L-level, the flip-flop 6 is kept a state just prior to the start of the reproduction by the second rotary head while the second rotary head reproduces the digital signal. The status that all of the first 8 data blocks reproduced by the first rotary head have errors means blinding is occurred in the first rotary head.

The Q-terminal output of the flip-flop 6 is fed to an AND circuit 10 and an inverter 11. The latter feeds an inverted Q-terminal output to an AND circuit 12. The frame clock FLC is inverted by an inverter 13 and the output thereof is fed to the AND circuit 10. Also, the frame clock FLC is fed to the AND circuit 12. The count pulse derived from the AND circuit 7 are fed to the AND circuits 10 and 12. Accordingly, the AND circuit 10 passes 120 count pulses CP associated with the first rotary head when the Q-terminal of the flip-flop 6 is at the H-level and, on the other hand the AND circuit 12 passes 120 pulses of the count pulses CP associated with the second rotary head when the Q-terminal of the flip-flop 6 is at the L-level.

The count pulses CP derived from the AND circuits 10 and 12 are supplied to the terminal (a) of a data selector 15 via an OR circuit 14. To the terminal (b), there are provided all of the count pulses CP passing the terminal 1b. The data selector 15 selects one of two input signals applied to the input terminals in response to one bit of the mode signal MODE applied thereto. In detail, the data selector 15 passes the count pulses CP applied to the terminal (a) when a predetermined bit of the signal MODE is at the H-level, which means that the digital audio signal is recorded on the tracks of the magnetic tape in accordance with the recording format using interleaving. On the other hand, the data selector 15 passes all of the count pulses CP applied to the terminal (b), when the predetermined one bit of the signal MODE has the L-level, which means that the digital signal is not recorded in accordance with the interleaving format.

Figure 5:
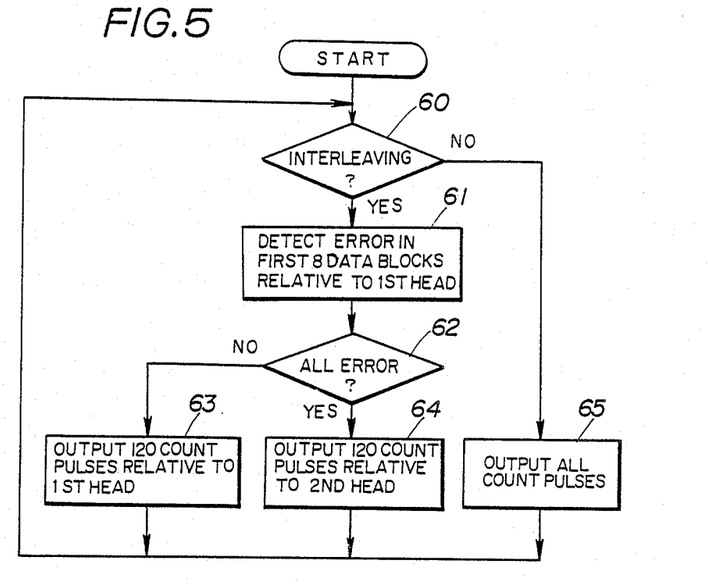
FIG. 5 is a flow chart illustrating operation of the circuit shown in FIG. 4.

The operation of the head monitor circuit 2 described in the foregoing is shown in FIG. 5. In this figure, first of all, it is checked whether the digital audio signal is recorded in accordance with the recording method using interleaving (step 60). When the recording using interleaving is employed, the detection of the first 8 blocks of the data blocks reproduced by the first rotary head is performed (step 61). Then, it is checked whether all of the first 8 data blocks have errors (step 62). When there is at least one data block having no error, the following 120 the count pulses CP are outputted when the reproducing is carried out by the first rotary head (step 63). On the other hand, when all of the first 8 data blocks have errors, 120 count pulses CP except the first 8 pulses are outputted when the reproducing operation is carried out by the second rotary head (step 64). At the step 60, when the recording manner using interleaving is not employed, all of the count pulses CP relative to both the first and second rotary heads are outputted (step 65).

The description will now be given of a configuration for producing a muting control signal. This configuration is made up of an error rate control circuit 21, a gate circuit 30, a gate control circuit 31, an adder, a latch circuit 51, a decoder 52 and a JK flip-flop 54 shown in FIG. 2. In particular, the combination of the error rate control circuit 21, the adder 50 and the latch circuit 51 forms an up-down counter, as will be described hereafter. The up-down counter carries out up-counting and down-counting operation in accordance with state of the error signal. Then, it retains at approximately constant count value when the error rate of the reproduced digital audio signal is a predetermined value.

Figure 6:
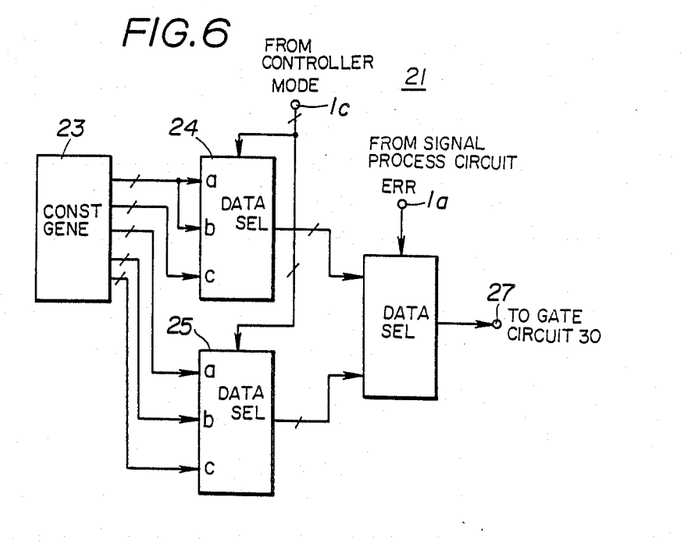
FIG. 6 is a circuit diagram illustrating a detailed configuration of an error rate control circuit shown in FIG. 2.

The description will first be given of an error rate control circuit 21 shown in FIG. 2. Referring to FIG. 6 which illustrates the circuit diagram of the error rate control circuit 21, a constant generator 23 generates a plurality of constants each composed of a plurality of bits. For instance, the generator 23 generates the following four constants each composed of 8 bits: 1 (=0000 0001), 2 (=0000 0010), −1 (=1111 1111) and −4 (=1111 1100). The above negative values are represented as two's complements. The constant 1 is fed to the terminals (a) and (b) of a data selector 24, and the constant 2 is fed to the terminal (c) thereof. The constants −2 (1111 1110), −4 and −1 are applied to the terminals (a), (b) and (c) of a data selector 25, respectively. The data selectors 24 and 25 receive some bits of the mode signal MODE, 2 bits for example. The data selectors 24 and 25 select the constants applied to the terminals (a) when the mode signal MODE indicates the first mode, and select the constants applied to the terminals (b) when the mode signal MODE indicates the second mode, and select the constants applied to the terminals (c) when the mode signal MODE indicates the third mode. The above three modes correspond to play mode such as a 48 kHz, a 32 kHz of the sampling frequency and a skip mods of the R-DAT. The outputs of the data selectors 24 and 25 are fed to the terminals (a) and (b) of a data selector 26, respectively. The data selector 26 outputs the constant applied to the terminal (a) when the error signal at the terminal 1a is at the L-level and, on the other hand outputs the constant applied to the terminal (b) when the error signal at the terminal 1a is at the H-level.

Figure 7:
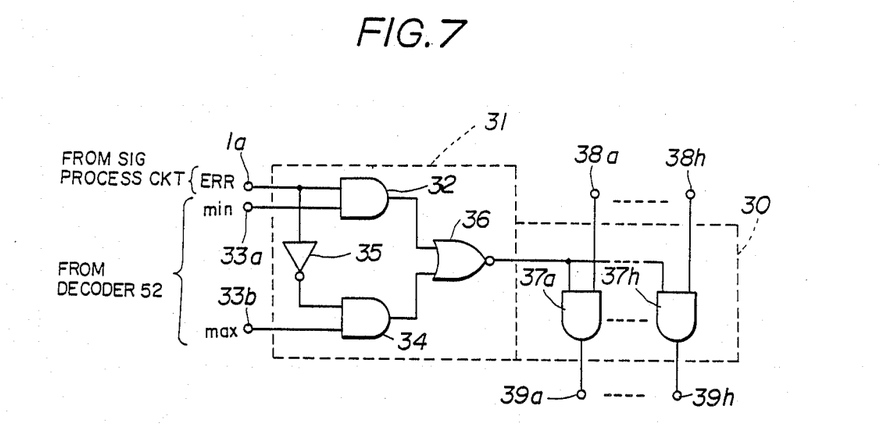
FIG. 7 is a circuit diagram illustrating a detailed structure of a gate circuit and a gate control circuit shown in FIG. 2.

The constant composed of 8 bits at the terminal 27 is fed to a gate circuit 30 shown in FIG. 2. FIG. 7 illustrates a detailed configuration of the gate circuit 30 and a gate control circuit 31. Referring to FIG. 7, an AND circuit 32 in the gate control circuit 31 receives the error signal ERR and a minimum value indication signal (min) from the terminal 33a. An AND circuit 34 receives the inverted error signal via an inverter 35 and a maximum value indication signal (max). The signals (min) and (max) are generated by the decoder 52, when the output value of the latch circuit 51 reaches predetermined values, as will be described hereafter. A NOR circuit 36 produces a gate signal of H-level by using the output signals of the AND circuits 32 and 34, when the minimum value indication signal is at the L-level and the error signal is at the H-level, and when the maximum value indication signal is at the L-level and the error signal is at the L-level. The output signal thus obtained is fed to each of AND circuits 37a, 37b, . . . , and 37h which form the gate circuit 30.

Each of the AND circuits 37a, 37b, . . . , and 37h also receives the corresponding bit of the constant derived from the error rate control circuit 21. Thus, the AND circuits 37a, 37b, . . . , and 37h feed the corresponding bits of the constant having 8 bits to the terminal (a) of an adder 50 via terminals 39a, 39b, . . . , and 39h, when the gate signal from the gate control circuit 31 is at the H-level. On the other hand, all of the AND circuits 37a, 37b, . . . , and 37h provide the terminal (a) of the adder 50 with zeros when the gate signal is at the L-level.

The adder 50 adds the values applied to the input terminals thereof to each other and provides a latch circuit 51 with the added result made up of, for instance, 8 bits in parallel. The latch circuit 51 receives the count pulses derived from the head monitor circuit 2 and latches the output of the adder 50 in synchronization with the leading edge of each of those count pulses. The latched value is fed to a decoder 52 and the terminal (b) of the adder 50 in the form of 8-bit-parallel signal. The combination of the error rate control circuit 21, the adder 50 and the latch circuit 51 acts as an up-down counter, described heretofore.

The decoder 52 generates the minimum value indication signal (min) having the H-level when the count value of the up-down counter, which is the output of the latch circuit 51 is less than a predetermined minimum value MIN. The decoder 52 also generates a mute-on signal MON having the H-level when the count value is equal to a predetermined mute-on value MUTE-ON (>MIN). Further, the decoder 52 generates a mute-off signal MOFF having the H-level when the count value is equal to a predetermined mute-off value MUTE-OFF (>MUTE-ON). Still further, the decoder 52 generates the maximum value indication signal (max) having the H-level when the count value exceeds a predetermined maximum value MAX (>MUTE-OFF). Then, the maximum value indication signal (max) and the minimum value indication signal (min) are fed to the gate control circuit 31. The mute-on signal MON is fed to the J-terminal of a JK flip-flop 54, and the mute-off signal MOFF is fed to the K-terminal thereof.

The values MAX, MIN, MUTE-ON and MUTE-OFF are set as follows. The values MIN and MUTE-OFF are set so that the period of time from the start of the reproducing operation to the start of the audio output becomes a desired length. The values MAX and MUTE-ON are set so that the period of time from the end of the reproducing operation to the end of the audio output becomes a desired length. The values MUTE-OFF and MUTE-ON are set so that a hysteresis property in which the error rate for mute-on is different from the error rate for mute-off is obtained to avoid the unstable operation upon the reproducing operation. The decoder 52 sets the values MIN, MAX, MUTE-ON and MUTE-OFF for each of the first, second and third modes, in response to two bits of the mode signal MODE applied to the terminal 1c thereof.

The mute-on signal MON and mute-off signal MOFF produced by the decoder 52 are fed to the J-input terminal and the K-input terminal of a JK flip-flop 54, respectively. The count pulses CP derived from the head monitor circuit 2 are fed to the clock input terminal of the flip-flop 54. Then, the flip-flop 54 generates a muting control signal whose H-level indicates execution of muting in response to the count pulses applied to its clock input terminal. The muting control signal is then sent to a muting circuit (not shown) for muting the reproduced audio signal.

As to the operation of the up-down counter mentioned above, in the first mode, the constant $-2$ is fed to the terminal (a) of the adder 50 when the error signal is at the H-level, and the constant 1 is fed thereto when the error signal is at the L-level. Therefore, the count value of the up-down counter which is the output of the latch circuit 51 is approximately kept constant when the error rate is 33.3%. In other words, when there are two data blocks having no error with respect to one data block having error, the count value is nearly kept constant.

Similarly, in the second mode, the constant $-4$ (or 1) is fed to the terminal (a) of the adder 50 when the error signal is at the H-level (or L-level), and the count value at the output terminal of the latch circuit 51 is kept nearly constant when the error rate is 20%. Similarly, in the third mode, the constant $-1$ (or 2) is fed to the terminal (a) of the adder 50 when the error signal is at the H-level (or L-level), and thus the count value at the output of the latch circuit 51 is kept nearly constant when the error rate is 66.7%.

Figure 8:
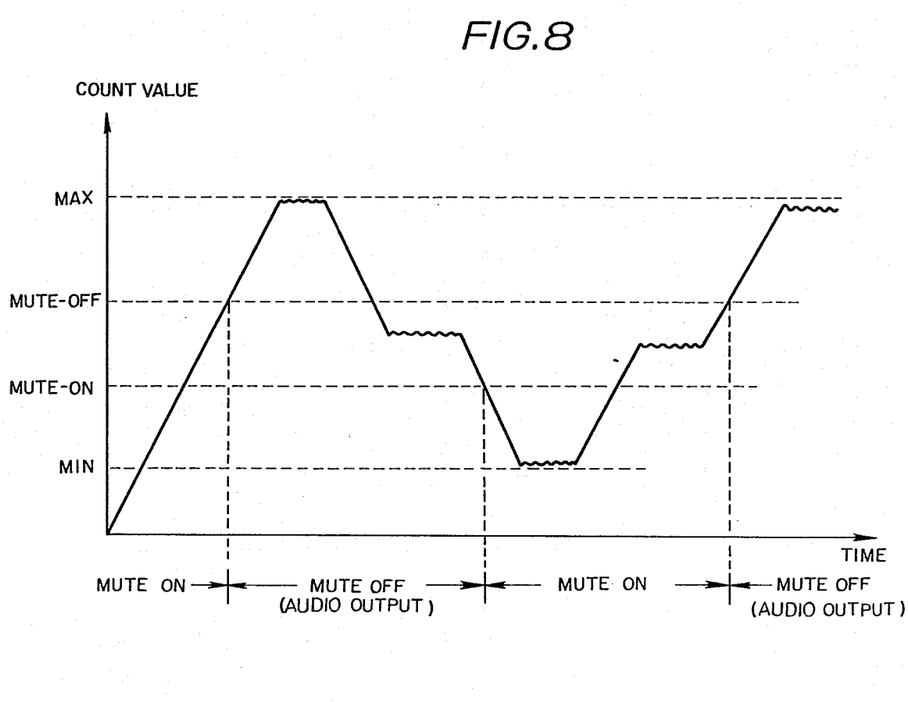
FIG. 8 is a view for explaining operation of the apparatus shown in FIG. 2.

For example, in the second mode, when the error rate is less than 20% after the reproducing operation is initiated, the count value of the up-down counter is increased as shown in FIG. 8. In this case, the less the error rate is, the larger the rate of increase of the count value becomes. Then, when the count value exceeds the value MUTE-OFF, the level of the muting control signal derived from the flip-flop 54 is changed to the L-level, and correspondingly reproduced signal is outputted. Then, when the count value becomes equal to the maximum value MAX, the up-counting operation of the up-down counter is disabled and only the down-counting operation is possible. Then, when the error rate exceeds 20%, the count value is decreased. In this case, the larger the error rate is, the larger the rate of decrease of the counter value becomes. The count value is kept constant at an arbitrary value when the error rate is 20%. Further, as long as the error rate exceeds 20% the count value continues to be decreased. Then if the count value becomes less than the mute-on value MUTE-ON, the level of the muting control signal becomes high and thus the outputting operation of the audio signal is stopped. Then, if the level of the count value becomes equal to the minimum value MIN, the down-counting operation of the up-down counter is disabled and thus only the up-counting operation is possible. In the first or third modes, the similar operation as that in the second mode is carried out. However, it should be noted that in the first and third modes, the count values of the up-down counter are appropriately constant when the error rate is 33.3%, and 66.7%, respectively. It will be understood from the above description that it is possible to carry out the muting control corresponding to the amount of the noise which would be generated on the analog audio signal which is obtained by converting the reproduced digital audio signal, because the count value of the up-down counter varies as the error rate varies. In addition, it is possible to obtain desired timing for starting the output of the reproduced audio signal after the reproducing operation is initiated, and timing for terminating the output operation of the reproduced audio signal after the reproducing operation is terminated. It is also possible to obtain the muting control having a hysteresis property.

Further, when the digital signal recorded in accordance with the interleaving format is reproduced from the magnetic tape, 120 pulses of the 128 count pulses relative to the first rotary head are fed to the latch circuit 51 and the flip-flop 54, if there exists no blinding in the first rotary head. Then, the up-down counter carries out the count operation in response to those 120 pulses, by using the error signal ERR relative to the first rotary head. On the other hand, the up-down counter is kept disabled while the second rotary head performs the reproducing operation. On the contrary, if the error rate of the digital signal reproduced by the first rotary head is 100%, the 120 pulses of the 128 count pulses which are obtained when the second rotary head reproduces the digital audio signal, are fed to the latch circuit 51 and the flip-flop 54. Then, the up-down counter performs the count operation in response to those 120 pulses by using the error signal relative to the second rotary head. As discussed in the foregoing, the up-down counter is operable and its count value varies when the reproducing operation is performed by one of the first and second rotary heads which has no blinding. Therefore, even when blinding occurs in the second rotary head, the muting control signal obtained at the terminal 55 is kept low and the muting control operation is not carried out, if the error rate of the digital audio signal reproduced by the first rotary head is low.

Figure 9:
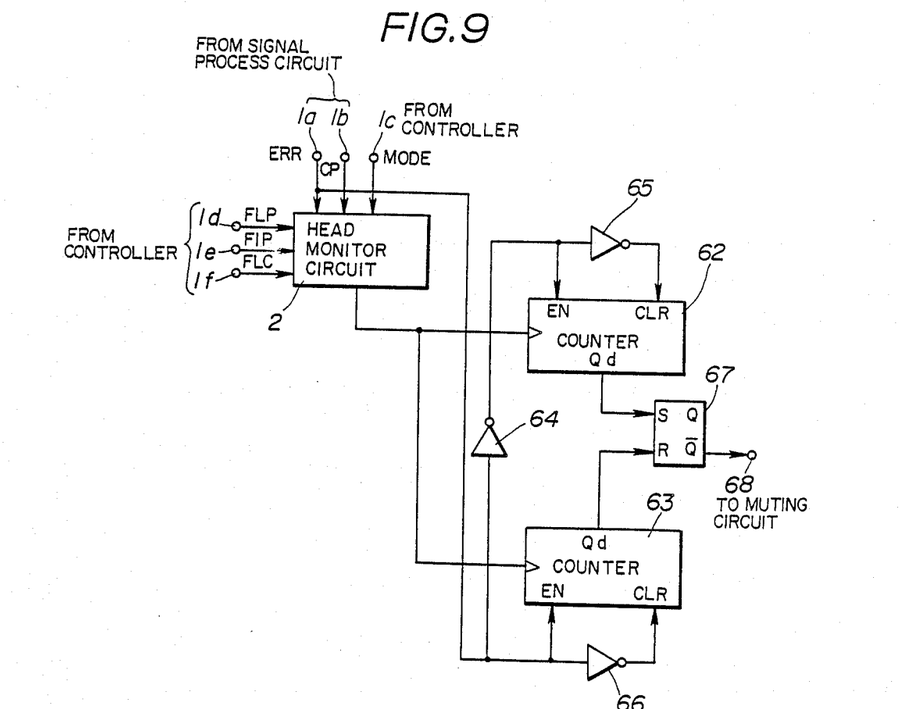
FIG. 9 is a block diagram illustrating another embodiment according to the present invention.

The description will now be given of another embodiment according to the present invention, with reference to FIG. 9. As mentioned before, the apparatus shown in FIG. 2 performs the muting control on the basis of the error rate. On the other hand, an apparatus shown in FIG. 9 generates the muting control signal without utilizing the error rate. In FIG. 9, the count pulses derived from the head monitor circuit 2 which is the same as that in FIG. 2 are fed to the clock input terminals of counters 62 and 63. The enable terminal EN and the clear terminal CLR of the counter 62 receive an inverted error signal obtained by inverting the error signal ERR by means of an inverter 64 and the error signal ERR obtained by further inverting the inverted error signal by means of an inverter 65, respectively. The error signal ERR and an inverted error signal obtained by inverting the error signal by means of an inverter 66 are fed to the enable terminal EN and the clear terminal CLR, respectively.

The counter 62 counts the count pulses provided by the head monitor circuit 2 when the error signal ERR is at the L-level, and clears the count value when it is at the H-level. The counter 62 outputs a signal of the H-level through its terminal Qd when the count value is equal to 8, for example. The counter 63 counts the count pulses when the error signal has the H-level, and clears the count value when it is at the L-level. The counter 63 outputs a signal of the H-level through its terminal Qd. Therefore, a flip-flop 67 is set when 8 consecutive data blocks each having no error are reproduced. Alternatively, the flip-flop 67 is reset when 8 consecutive data blocks each having errors, and outputs a muting control signal through terminal 68 to a muting circuit (not shown) for muting the reproduced audio signal.

In the apparatus shown in FIG. 9, when the digital audio signal which is recorded by the recording method using interleaving is reproduced, the error signal ERR relative to the rotary head without having blinding due to dust or the like is selected by the indication of the head monitor circuit 2. Then, the muting control signal is generated by using the selected error signal.

From the foregoing, it will now be apparent that a novel and improved muting control apparatus has been proposed. It should be understood of course that the embodiments disclosed are merely illustrative and are not intended to limit the scope of the invention. For example, it is not necessarily to vary the count-up values and the count-down values corresponding to each of the three modes. Also, the count value used in the embodiments is not limited to be 8 bits.

What is claimed is:

1. A muting control apparatus adapted to a recording and reproducing system having first and second rotary heads which alternately scan tracks on a magnetic tape, each track storing N (N is a natural number) data blocks of a digital audio signal obtained by encoding a sampled analog audio signal every data block, wherein said muting control apparatus determines whether to mute a reproduced audio signal, by using an error signal which indicates whether each data block of a reproduced digital audio signal has error, said muting control apparatus comprising, first means for indicating selection of the error signal relative to N−m (m is a natural number satisfying m<N) data blocks reproduced by the second rotary head when all of the first m data blocks of N data blocks reproduced by the first rotary head have errors, and for indicating selection of the error signal relative to N−m data blocks reproduced by the first rotary head when at least one of the first m data blocks of said N data blocks reproduced by the first rotary head has no error, and second means for generating a muting control signal indicating whether to mute said reproduced audio signal, by using the error signal which is selected by said first means.

2. A muting control apparatus as claimed in claim 1, wherein said first means comprises count means for counting the first m pulses of count pulses relative to the first rotary head, one count pulse being generated every data block, means for producing a head selection signal in response to the error signal which is applied during said first m pulses of the count pulses being counted by said count means, the head selection signal representing whether all of said first m data blocks have errors, and gate means responsive to said head selection signal for selectively passing the N−m count pulses relative to the second rotary head or the N−m count pulses relative to the first rotary head, so that said second means generates the muting control signal by using the error signal which is specified by the N−m count pulses passed through said gate means.

3. A muting control apparatus as claimed in claim 2, wherein said first means further comprises selecting means for selecting the output signal of said gate means when the digital signal is recorded on said magnetic tape in accordance with a recording format using interleaving, and for selecting all of the N count pulses relative to each of said first and second rotary heads when the digital signal is recorded on said magnetic tape in accordance with a recording format without using interleaving, so that the output signal of said selecting means is fed to said second means.

4. A muting control apparatus as claimed in claim 1, wherein said second means generates the muting control signal on the basis of an error rate which is calculated by using said error signal indicated by said first means.

5. A muting control apparatus as claimed in claim 4, wherein said second means comprises count means for generating a count value which varies as the value of the error rate of the reproduced digital audio signal, and means for comparing said count value with predetermined values, so that said second means generates the muting control signal on the basis of the compared result provided by said comparing means.

6. A muting control apparatus as claimed in claim 5, wherein said count means is an up-down counter whose count-up value and count-down value, one of which is counted at one time, are different from each other.

7. A muting control apparatus as claimed in claim 6, wherein said up-down counter counts one of count-up value and count-down value in accordance with the level of the error signal.

* * * * *